United States Patent [19]

Warman et al.

[11] 4,181,918
[45] Jan. 1, 1980

[54] TELEVISION RECEIVER PROJECTION SYSTEM

[76] Inventors: Robert E. Warman, 695 St. Clair, Grosse Pointe, Mich. 48230; Cortland R. Dusseau, 1633 S. Cass Lake Rd., Keego Harbor, Mich. 48033

[21] Appl. No.: 894,574

[22] Filed: Apr. 7, 1978

[51] Int. Cl.² .................... H04N 5/74; H04N 5/645; H04N 5/72; H04N 5/64
[52] U.S. Cl. .................................. 358/237; 358/248; 358/250; 358/254; 312/7 TV
[58] Field of Search ................ 358/60, 64, 237, 248, 358/249, 254, 250; 312/7 TV; 353/119; D14/77, 81, 82

[56] References Cited

U.S. PATENT DOCUMENTS

| D. 235,655 | 7/1975 | Clement et al. | D14/77 X |
|---|---|---|---|
| 2,119,102 | 5/1938 | Flaherty | 358/254 X |
| 2,512,553 | 6/1950 | Reid | 358/254 X |
| 2,805,411 | 9/1957 | Rose | 358/254 X |
| 3,800,085 | 3/1974 | Ambats et al. | 358/250 X |
| 3,944,734 | 3/1976 | Ogawa | 358/237 X |
| 3,949,167 | 4/1976 | Koyama et al. | 358/237 |
| 4,021,105 | 5/1977 | Schubach | 358/254 X |
| 4,058,837 | 11/1977 | Muntz | 358/237 |

FOREIGN PATENT DOCUMENTS 457510  11/1936  United Kingdom .................... 358/254

OTHER PUBLICATIONS

Electronic Servicing, Jun. 1978, pp. 14–16; "1979 Color TV Previews, General Electric Widescreen 1000."
Wireless World, vol. 82, No. 1490, pp. 67–72, Oct. 1976: "Projection TV–2–Refractive Projectors."
Radio Electronics, Dec. 1976, pp. 44–46: "Projection TV Roundup."

Primary Examiner—Robert L. Griffin
Assistant Examiner—Aristotelis M. Psitos
Attorney, Agent, or Firm—Krass & Young

[57] ABSTRACT

An economical system for magnifying and projecting the image generated on a television receiver cathode ray tube employs a vertical deflection reversing switch to invert and laterally reverse the image, and a three element lens within a light-proof projection chamber to re-invert, magnify and project the image onto a forward projection type reflective screen. The projection chamber utilizes a white diffuse reflective surface upon its inner walls to increase the intensity of the projected image without visibly reducing the resolution of the image. The system also utilizes a cylindrical lens assembly to provide a simplified focusing arrangement.

3 Claims, 5 Drawing Figures

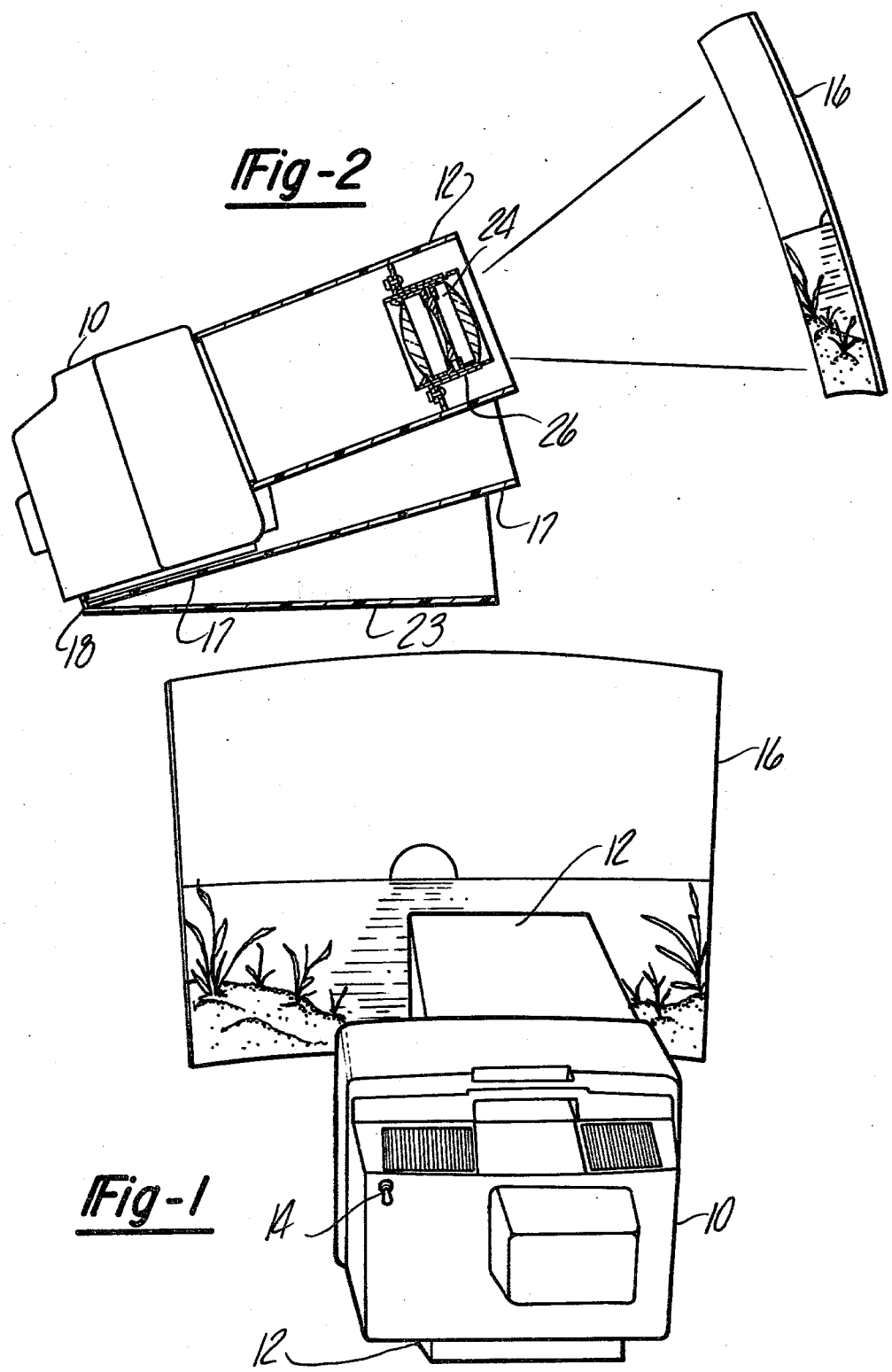

TELEVISION RECEIVER PROJECTION SYSTEM

BACKGROUND OF THE INVENTION

1. Field of the Invention

This invention relates to the magnification and projection of images from a television receiver cathode ray tube and more particularly to a system that utilizes a vertical deflection reversing circuit and a lens system to project the images without the need for reducing the intensity of ambient light nor for increasing the cathode ray tube anode voltage to provide a visible projected image.

2. Description of the Prior Art

Most commercial television image magnification and projection systems are of the forward projection type. One of these systems utilizes three separate projection lenses, one for each of the colors blue, green and red, to provide a color image. This system, however, can be viewed only as a projected image but not directly from the television picture-tubes. Another forward projection system utilizes a standard portable television receiver together with an optical lens to produce an inverted and laterally reversed image. The re-inversion of the image may be accomplished by inverting the entire television receiver chassis. The lateral re-reversal of the image, however, is accomplished by either the use of a mirror system, or by reversing the horizontal deflection circuit of the television receiver. Since this system requires that the television receiver chassis be inverted, the system has the disadvantage of altering the normal circuit cooling operation and requiring that the television receiver controls be operated while they are inverted.

A system that eliminates the need for a mirror system a reversal of the horizontal deflection circuit or inverting the television receiver chassis is disclosed in U.S. Pat. No. 3,800,085 which discloses a convertible/direct viewing projection television receiver system wherein a vertical deflection reversing circuit inverts and laterally reverses the image on a cathode ray tube, and an objective lens re-inverts, magnifies and projects the image onto a forward type projection screen. Because of light losses in the lens system and in the projection assembly unless the anode voltage of the cathode ray tube is increased, this system provides an enlarged projected image of relatively low intensity. In order to increase the anode voltage relatively expensive modifications to the television receiver are required. In addition such modifications require that the television receiver be recertified by the Federal Communications Commission. Accordingly, it is desirable to provide a system which provides a projected image having increased intensity, without the need for modifications to the television receiver.

SUMMARY OF THE INVENTION

This invention is directed toward a system for magnifying and projecting an image from a television receiver cathode ray tube onto a forward projection type reflective screen, without the need for reducing the intensity of ambient light nor for increasing the anode voltage of the cathode ray tube in order to view the projected image. In general this is accomplished by utilizing a light proof projection chamber having a white diffuse reflective surface upon its inner walls, to enclose both a lens assembly and the screen of the cathode ray tube. In addition the intensity of the cathode ray tube image is maximized by adjusting the television receiver automatic brightness limiter to a near maximum setting. The invention also provides a simplified focusing assembly for focusing the projected image.

Other features, objects and advantages of the invention will become apparent from the drawings and description of the preferred embodiment of the invention. The description makes reference to the accompanying drawings in which:

FIG. 1 is a perspective view of the preferred embodiment of the invention;

FIG. 2 is a cross-sectional view of the preferred embodiment shown in FIG. 1.

DETAILED DESCRIPTION OF THE PREFERRED EMBODIMENTS

Figure 3:
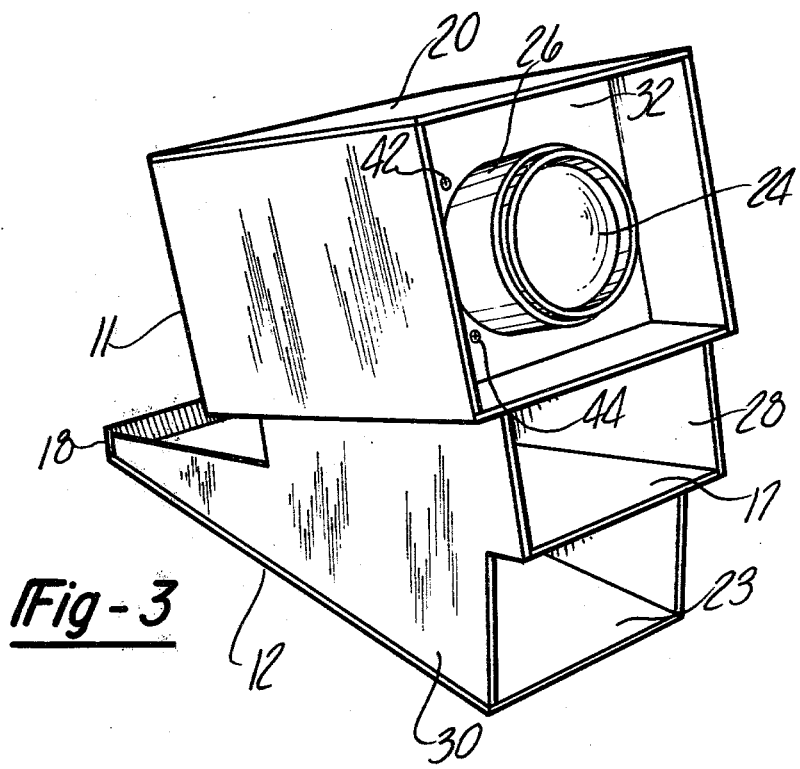
FIG. 3 is a three-quarter perspective front view of the enclosure shown in FIG. 1.

Referring to FIG. 1 a portable television receiver 10 is supported by an enclosure 12. A flange 11 of the enclosure 12 fits closely around the front end of the television receiver 10. A vertical deflection reversing switch 14 is mounted on the rear portion of the television receiver 10. An image produced by the television 10 is projected onto a forward projection type reflective screen 16 by a lens system contained within the enclosure 12, which will subsequently be described.

In operation the television receiver 10 is placed within the enclosure 12. The enclosure 12 is constructed to support a particular model of television receiver, prevent extraneous light from entering the enclosure and yet allow easy removal of the receiver 10. In the preferred embodiment of the invention the receiver 10 is a Quasar Electronics Company Solid State Color television receiver, 12 inch diagonal measure, Model No. WP3422PW. In order to maximize the intensity of the cathode ray tube range, and thus the intensity of the projected image the automatic brightness limiter of the television receiver is adjusted to a point where the cathode ray tube image "blooms". The limiter is then adjusted back slightly to thereby give a maximum intensity. The vertical deflection reversing switch 14 may be manually actuated to cause reversal of the vertical deflection circuit of the television receiver 10, thereby causing the television 10 to produce an inverted and laterally reversed image on its screen. The image produced by the television receiver 10 is re-inverted, magnified and projected onto the screen 16 by the lens system. Since the screen 16 is of a forward projection type, the image reflected from the screen is laterally re-reversed and thus appears normal to a viewer. In the preferred embodiment of the invention the reflective screen 16 is a laterally curved screen having an aluminized surface. The enclosure 12 may be constructed from an opaque plastic material.

Referring to FIG. 2 the television receiver 10 is mounted on an inclined support 17 and held between a ridge 18 at the rear of the enclosure 12 and a flange 11 at the rear of a rectangular projection chamber 20. The flange 11 at the rear of the projection chamber 20 provides a close fit with the screen of a cathode ray tube 22 in order to prevent extraneous light from entering the projection chamber 20. A base 23 having a flat surface, provides structural support for the entire enclosure 12.

A lens assembly 24 is mounted within a metal cylindrical housing 26. The cylindrical housing is fastened to a front wall 32 of the projection chamber 20. The lens assembly 24 contains a plurality of optical and structural components, which will subsequently be described.

In operation the lens assembly 24 is mounted within the cylindrical tube 26 and is adjusted to a specific distance from the cathode ray tube 22 in order to provide a properly focused image on the screen 16.

The amount of magnification provided by the lens assembly is primarily dependent upon the distance from the lens assembly 24 to the screen 16. In the preferred embodiment of the invention, the distance from the lens assembly 24 to the screen 16 is normally 5 to 6 feet and the distance from the picture tube 22 to the outermost lens of the assembly 24 is 12 inches±¾ inch. With those specific distances the image on the screen 16 is approximately 48 inches diagonally. A larger or smaller image may be obtained by varying the distance between the lens assembly 24 and the screen 16 and adjusting the lens assembly 24 for a proper focus. However, as the image is magnified, its intensity decreases.

The inner walls of the projection chamber 20 have a white surface which provides diffuse reflection of any light falling upon the inner walls. Through experimentation it has been determined that the use of a white surface which provides diffuse reflection provides the highest intensity projected image without a visible loss of resolution, compared to other reflective or non-reflective surfaces.

FIG. 3 shows a three-quarter perspective front of the enclosure 12. A pair of side walls 28 and 30 are shaped to support the projection chamber 20 parallel to the inclined support 17. Both the inclined support 17 and the projection chamber 20 are at an acute angle with respect to the base 23. In addition to providing support for a television receiver, not shown in FIG. 3, the inclined support 17 provides structural support to the enclosure 12.

The cylindrical housing 26, in which the lens assembly 24 is positioned, is secured to the front wall 32 at the projection chamber 20 by a set of four screws and four nuts. Only a pair of screws 42 and 44 are shown in FIG. 3.

Figure 4:
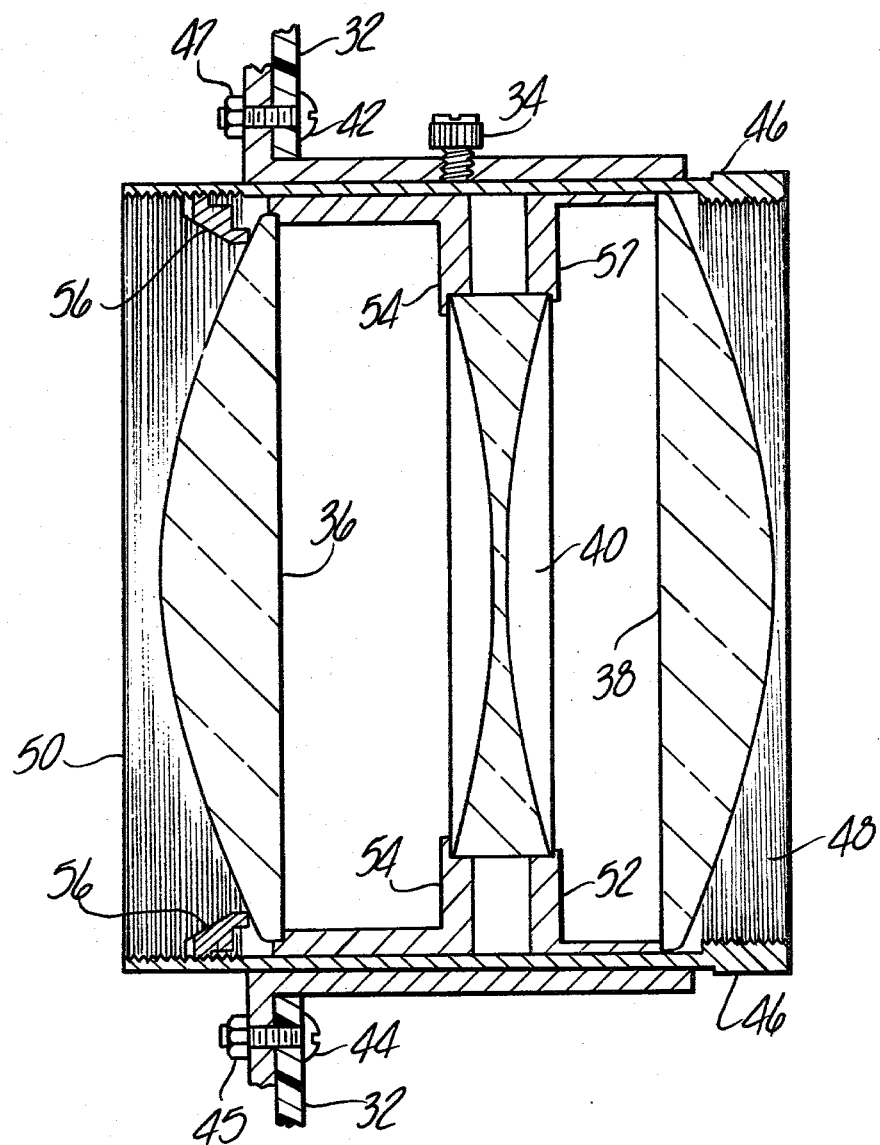
FIG. 4 is a detailed sectional view of the lens assembly employed in the preferred embodiment of the invention.

Referring to FIG. 4 the lens assembly 24 slides within the cylindrical tube 26 and is locked in a fixed position by a nylon screw 34. The cylindrical tube 26 is secured to the front wall 32 of the projection chamber 20 by a set of four screws and four nuts. Only the screws 42 and 44 and nuts 45 and 47 are shown in FIG. 4.

The lens assembly 24 employs a pair of plano-convex converging lenses 36 and 38 each having their flat sides facing toward the middle of the assembly 24. Positioned half-way between the lenses 36 and 38 is a double concave diverging lens 40. In the preferred embodiment of the invention each of the lenses 36 and 38 has a diameter of 5 inches and a maximum thickness of ¾ inch. In addition the double concave diverging lens 40 has a diameter of 3 13/16 inches, a center thickness of 5/10 inch and an outer edge thickness of 13/16 inch. The distance from the flat surface of the lens 36 to the flat surface of lens 38 is 2⅞ inches. The lens assembly 24 has an F-stop factor of 2.8. In the preferred embodiment of the invention the lenses 36, 38 and 40 are of glass, however, plastic lenses having similar optical characteristics may be substituted.

The lens assembly 24 also employs a housing 46 having a pair of threaded inner ends 48 and 50. A pair of aluminum holders 52 and 54 fit within the housing 46 and operate together with a spanner 56 to hold the lenses 36, 38 and 40 in a fixed position. The spanner 56 is a threaded ring which fits into the threaded inner end 50.

In the preferred embodiment of the invention the aluminum holders 52 and 54 have a black mat surface in order to prevent reflections. In addition in the preferred embodiment of the invention the housing 46 and the spanner 56 are of steel having a black finish. The black finish prevents reflections that would interfere with the operation of the lenses 36, 38 and 40.

Figure 5:
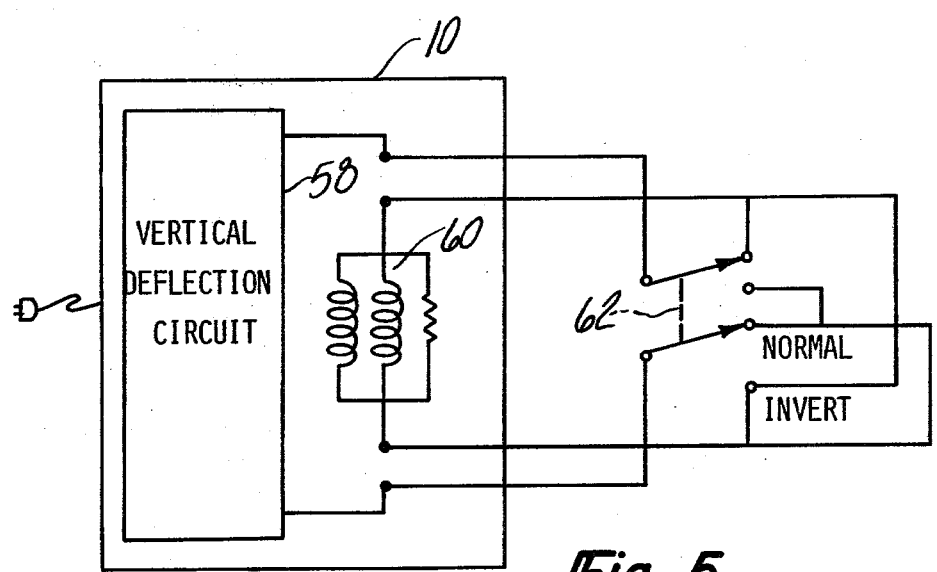
FIG. 5 is a schematic diagram of the vertical deflection reversing circuit employed in the preferred embodiment of the invention.

In FIG. 5 a vertical deflection circuit 58 of the television receiver 10 is connected to a set of vertical deflection coils 60 through a double pole double throw switch 62. The vertical deflection circuit controls the vertical motion of the electron beam travelling from the cathode to the anode of a cathode ray tube. The vertical deflection coils 60 produce an electromagnetic field, to thereby deflect, in varying amounts, the electron beam. The switch 62 is operated to thereby connect the deflection coils 60 in either a normal or reversed manner.

When the switch 62 is in the "normal" position, the deflection coils 60 are connected in a manner to provide a normal image on the cathode ray tube 22. However, when the switch 62 is in the "invert" position the circuit to the deflection coils is reversed, thereby producing the image on the picture tube of the television 10 which is inverted and laterally reversed. Although in the preferred embodiment of the invention, electromagnetic deflection is utilized by the television 10, electrostatic deflection may also be employed without departing from the invention.

The invention has been described with reference to a specific embodiment and it is to be understood that although this embodiment represents the best mode in practicing the invention known to the inventor at the time of filing the patent application, various modifications and additions to the illustrated embodiment are possible and accordingly the foregoing description is not to be construed in a limiting sense.

The embodiments of the invention in which an exclusive property or privilege is claimed are defined as follows:

1. For use in combination with a television set having a conventional cathode ray tube with an exposed face surrounded by a forwardly protruding structural flange and a base of generally rectangular configuration which is normally disposed on a support surface:
   a projection body comprising the substantially integral combination of a flat base member, means defining an inclined television set support surface above the flat base member and a projection enclosure having first and second longitudinally opposite open ends and disposed over a portion of the inclined support surface, one of the open ends being configured to receive and fit closely around the structural flange of the television set, and a lateral ridge on the means defining the inclined surface to receive and abut the base of the television set when placed on the inclined surface, the ridge being longitudinally spaced from the plane of the open end of the projection enclosure nearest the ridge such that the television set may be placed on the inclined surface with the face of the cathode ray tube projecting into the projection enclosure and the base abutting the ridge so as to secure the television set in the projection position without the use of fasteners, such as clamps or screws;

a lens system secured within the projection enclosure for projecting an image from the cathode ray tube surface onto a remote screen; and switch means for connection with the vertical deflection plates of the cathode ray tube to invert the image of the television screen for projection through said lens system.

2. Apparatus as defined in claim 1 further including a curved projection screen disposed in spaced relationship to the end of the projection enclosure.

3. Apparatus as defined in claim 1 wherein the projection enclosure is of a light interior color so as to intensify and enhance the projection of the television screen image.

* * * * *